US012566737B2

(12) United States Patent
Handa et al.

(10) Patent No.: US 12,566,737 B2
(45) Date of Patent: Mar. 3, 2026

(54) DATA QUALITY SOLUTION USING EDGE COMPUTING AND BLOCKCHAIN TECHNOLOGY

(71) Applicant: Mastercard International Incorporated, Purchase, NY (US)

(72) Inventors: Ambika Handa, Gurugram (IN); Lakshay Marwaha, Maqsudan (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 18/656,850

(22) Filed: May 7, 2024

(65) Prior Publication Data

US 2025/0348469 A1     Nov. 13, 2025

(51) Int. Cl.
*G06F 16/23*          (2019.01)
*G06F 16/215*        (2019.01)
*H04L 9/00*           (2022.01)

(52) U.S. Cl.
CPC ............ *G06F 16/215* (2019.01); *G06F 16/23* (2019.01); *G06F 16/2379* (2019.01); *H04L 9/50* (2022.05)

(58) Field of Classification Search
CPC ...... G06F 16/23; G06F 16/182; G06F 16/215; G06F 16/2379; H04L 9/50; H04L 63/126; G06N 20/00; G06N 3/08
See application file for complete search history.

(56) References Cited

U.S. PATENT DOCUMENTS

| | | | |
|---|---|---|---|
| 10,601,665 B2 | 3/2020 | Bathen et al. | |
| 11,341,488 B2 * | 5/2022 | Chapman | ........... G06Q 20/3829 |
| 11,763,332 B2 | 9/2023 | Long et al. | |
| 11,818,207 B1 * | 11/2023 | Paczkowski | ............ H04L 65/70 |
| 11,934,365 B1 | 3/2024 | Mehta | |
| 2019/0164220 A1 | 5/2019 | Raj et al. | |
| 2020/0394165 A1 | 12/2020 | Danda et al. | |
| 2021/0287117 A1 | 9/2021 | Dastmalchi et al. | |

(Continued)

FOREIGN PATENT DOCUMENTS

| | | |
|---|---|---|
| CN | 112948362 A | 6/2021 |
| WO | 2023287969 A1 | 1/2023 |
| WO | 2023005862 A1 | 2/2023 |

OTHER PUBLICATIONS

Stufi, Martin et al., "Big Data Architecture in Czech Republic Healthcare Service: Requirements, TPC-H Benchmarks and Vertica", Jan. 5, 2020, 40 pages.

(Continued)

*Primary Examiner* — Marcin R Filipczyk

(74) *Attorney, Agent, or Firm* — Panitch Schwarze Belisario & Nadel LLP

(57)          ABSTRACT

A method for enhancing security, reliability, and efficiency of data quality management comprising edge computing and blockchain network is disclosed. An edge server off-chain from the blockchain network is located in close proximity to a plurality of data sources with respect to other servers. The edge server performs an initial data analysis on received data entries. The blockchain node uses the plurality of data entries received from the edge server to determine whether the data quality is above or below a predetermined threshold value, and executes the smart contract based on the determined data quality and predefined rules.

12 Claims, 6 Drawing Sheets

(56) References Cited

U.S. PATENT DOCUMENTS

| 2023/0087557 | A1* | 3/2023 | Dai | ....................... | H04L 9/3073 |
| | | | | | 713/160 |
| 2024/0098500 | A1* | 3/2024 | Pateromichelakis | . | H04W 12/35 |
| 2024/0256678 | A1* | 8/2024 | Thompson | ............ | G06F 21/577 |

OTHER PUBLICATIONS

Liu, Yongnan, et al., "Blockchain-Based Task Offloading for Edge Computing on Low-Quality Data via Distributed Learning in the Internet of Energy", IEEE Journal on Selected Areas in Communications, vol. 40, No. 2, Feb. 2022, pp. 657-676.

Casado-Vara Roberto et al., "Blockchain Framework for IoT Data Quality Via Edge Computing", BlockSys '18: Proceedings of the 1st Workshop on Blockchain-enabled Networked Sensor Systems, pp. 19-24, Nov. 4, 2028 (pp. 19-23 and Fig. 1), published Nov. 4, 2018.

International Search Report and Written Opinion mailed Jul. 16, 2025 in corresponding International Patent Application No. PCT/US2025/022296, 9 pages.

* cited by examiner

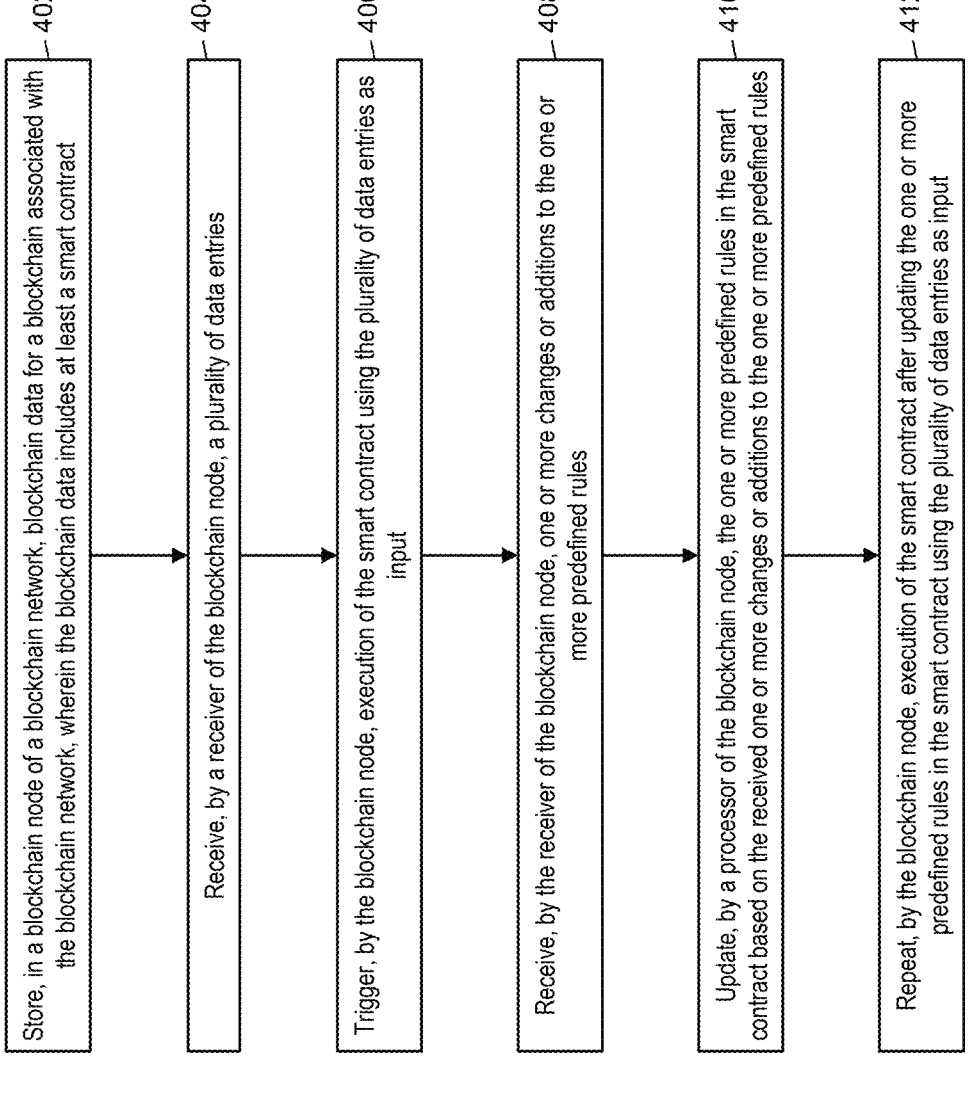

Store, in a blockchain node of a blockchain network, blockchain data for a blockchain associated with the blockchain network, wherein the blockchain data includes at least a smart contract — 402

Receive, by a receiver of the blockchain node, a plurality of data entries — 404

Trigger, by the blockchain node, execution of the smart contract using the plurality of data entries as input — 406

Receive, by the receiver of the blockchain node, one or more changes or additions to the one or more predefined rules — 408

Update, by a processor of the blockchain node, the one or more predefined rules in the smart contract based on the received one or more changes or additions to the one or more predefined rules — 410

Repeat, by the blockchain node, execution of the smart contract after updating the one or more predefined rules in the smart contract using the plurality of data entries as input — 412

DATA QUALITY SOLUTION USING EDGE COMPUTING AND BLOCKCHAIN TECHNOLOGY

FIELD

The present disclosure relates to enhancing data quality, specifically using a hybrid of edge computing and blockchain technologies to enhance the security, reliability, and efficiency of data quality management.

BACKGROUND

Data quality management is an important aspect of a variety of industries. A vast array of different industries all have different needs, interests, and requirements for the collection and storage of data, which has resulted in a large number of distinct and different data quality platforms. Many data quality platforms offer a variety of features that are tailored to the industries they serve, limiting parties in the available platforms they can utilize for their data quality needs, and also limiting the ability for the data quality platforms to serve additional industries. In addition, parties that have needs that can vary from the industry standard may find no existing data quality platform that can adequately serve their needs.

Insufficient or inadequate data quality solutions can result in a myriad of issues for a party in need of data storage. Problems can arise from fragmented data storage, increased operational complexity, elevated error rates, and heightened security risks, all of which can cause detrimental effects on various aspects of a business. Thus, there is a need for a data quality solution that is platform agnostic to be suitable for the needs of any party and that utilizes technologies in a way that can reduce errors and complexity while maintaining a high level of data quality.

SUMMARY

The present disclosure provides a description of systems and methods for enhancing security, reliability, and efficiency of data quality management. An edge server, located as close to data sources as possible to reduce the likelihood of data degradation or manipulation, can obtain data entries from a variety of different data sources. The edge server can perform initial data analysis on the data values to identify any potential data quality issues and securely transmit the data entries and results of the initial data analysis to a blockchain node in a blockchain network. The blockchain node can receive the data entries and initial data analysis and provide the data as input to a smart contract that is stored on the blockchain. The smart contract can execute and perform error correction to satisfy any data quality issues according to predefined rules and perform a data analysis to identify a level of data quality for the data entries. If the level of data quality is below a predetermined threshold value, such as anything below 100% data quality, the smart contract can generate a data quality management (DQM) report that indicates all of the data quality issues and transmit the report to an external computing system. Corrections and/or additions to the predefined rules can be identified by the external computing system and used to update the smart contract. The smart contract can execute again using the updated predefined rules for further error correction and an updated analysis for the level of data quality. The updating of rules and re-execution of the smart contract can continue until the predetermined threshold value of data quality has been reached, after which, the smart contract can initiate addition of the data entries into the blockchain. The result is a system that is platform agnostic and utilizes edge computing and blockchain to create an efficient and secure process for data quality management with significant advantages over existing data quality solutions.

A method for enhancing security, reliability, and efficiency of data quality management includes: storing, in a blockchain node of a blockchain network, blockchain data for a blockchain associated with the blockchain network, wherein the blockchain data includes at least a smart contract; receiving, by a receiver of the blockchain node, a plurality of data entries; triggering, by the blockchain node, execution of the smart contract using the plurality of data entries as input, wherein the executed smart contract performs error correction on the plurality of data entries according to one or more predefined rules and analyzes the plurality of data entries for data quality, and, if the data quality is below a predetermined threshold value, generates and transmits a data quality report to an external computing system, wherein the data quality report indicates one or more data quality issues based on the analysis, or, if the data quality is above the predetermined threshold value, generates a new blockchain data entry that includes the plurality of data entries and transmits the generated new blockchain data entry to one or more additional nodes in the blockchain network; receiving, by the receiver of the blockchain node, one or more changes or additions to the one or more predefined rules; updating, by a processor of the blockchain node, the one or more predefined rules in the smart contract based on the received one or more changes or additions to the one or more predefined rules; and repeating, by the blockchain node, execution of the smart contract after updating the one or more predefined rules in the smart contract using the plurality of data entries as input.

A system for enhancing security, reliability, and efficiency of data quality management includes: a blockchain network; an external computing system; a blockchain node included in the blockchain network; and one or more additional nodes included in the blockchain network, wherein the blockchain node includes a memory storing blockchain data for a blockchain associated with the blockchain network, the blockchain data including at least a smart contract, a receiver receiving a plurality of data entries, and a processor, the blockchain node triggers execution of the smart contract using the plurality of data entries as input, the executed smart contract performs error correction on the plurality of data entries according to one or more predefined rules and analyzes the plurality of data entries for data quality, and, if the data quality is below a predetermined threshold value, generates and transmits a data quality report to an external computing system, wherein the data quality report indicates one or more data quality issues based on the analysis, or, if the data quality is above the predetermined threshold value, generates a new blockchain data entry that includes the plurality of data entries and transmits the generated new blockchain data entry to one or more additional nodes in the blockchain network, the receiver of the blockchain node receives one or more changes or additions to the one or more predefined rules, the processor of the blockchain node updates the one or more predefined rules in the smart contract based on the received one or more changes or additions to the one or more predefined rules, and the blockchain node repeats execution of the smart contract after updating the one or more predefined rules in the smart contract using the plurality of data entries as input.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIG. 4 is a flow chart illustrating an exemplary method for enhancing security, reliability, and efficiency of data quality management in accordance with exemplary embodiments.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

System for Enhancement of Data Quality Management

Figure 1:
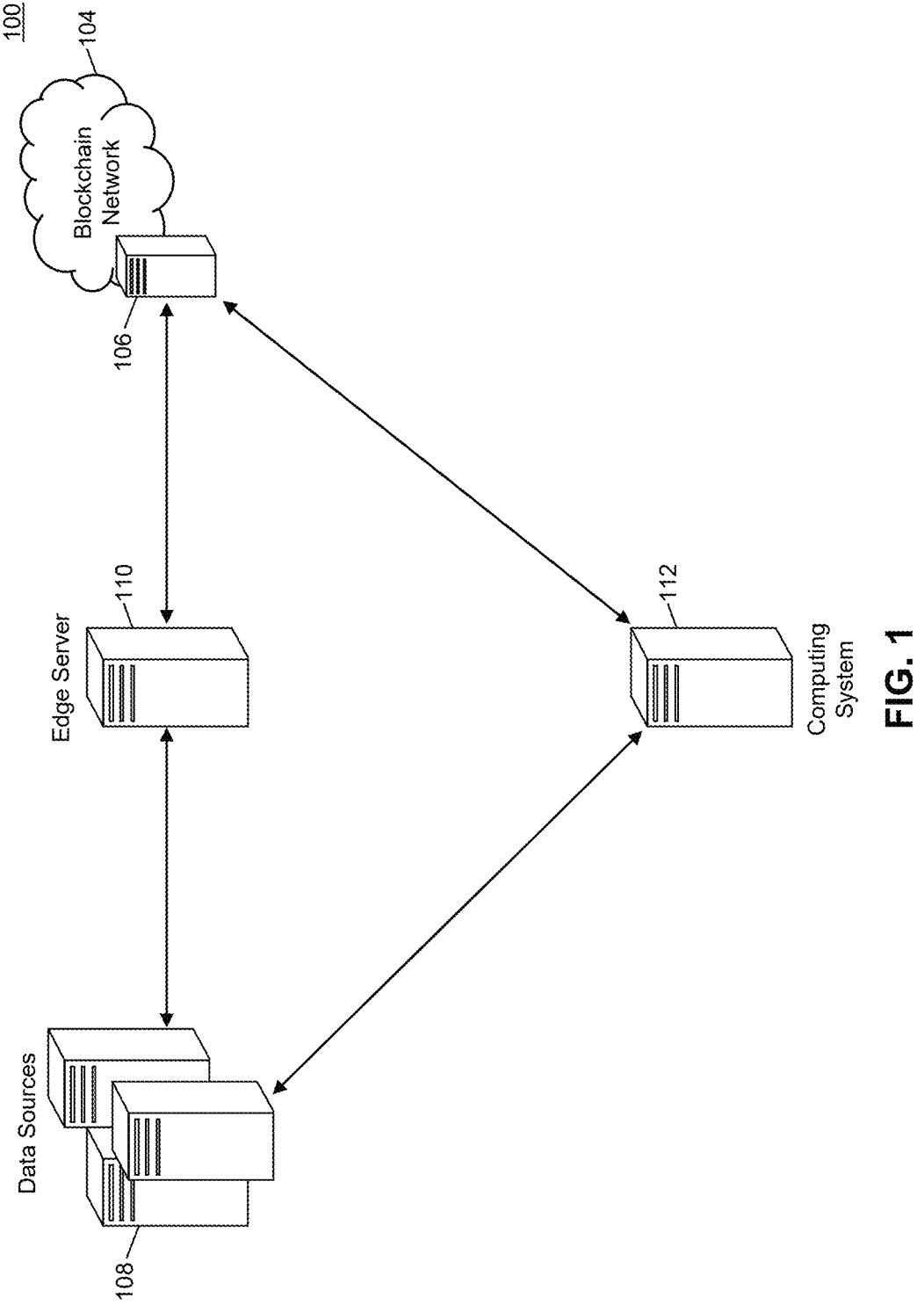
FIG. 1 is a block diagram illustrating a high level system architecture for enhanced data quality management using blockchain in accordance with exemplary embodiments.
Figure 2:
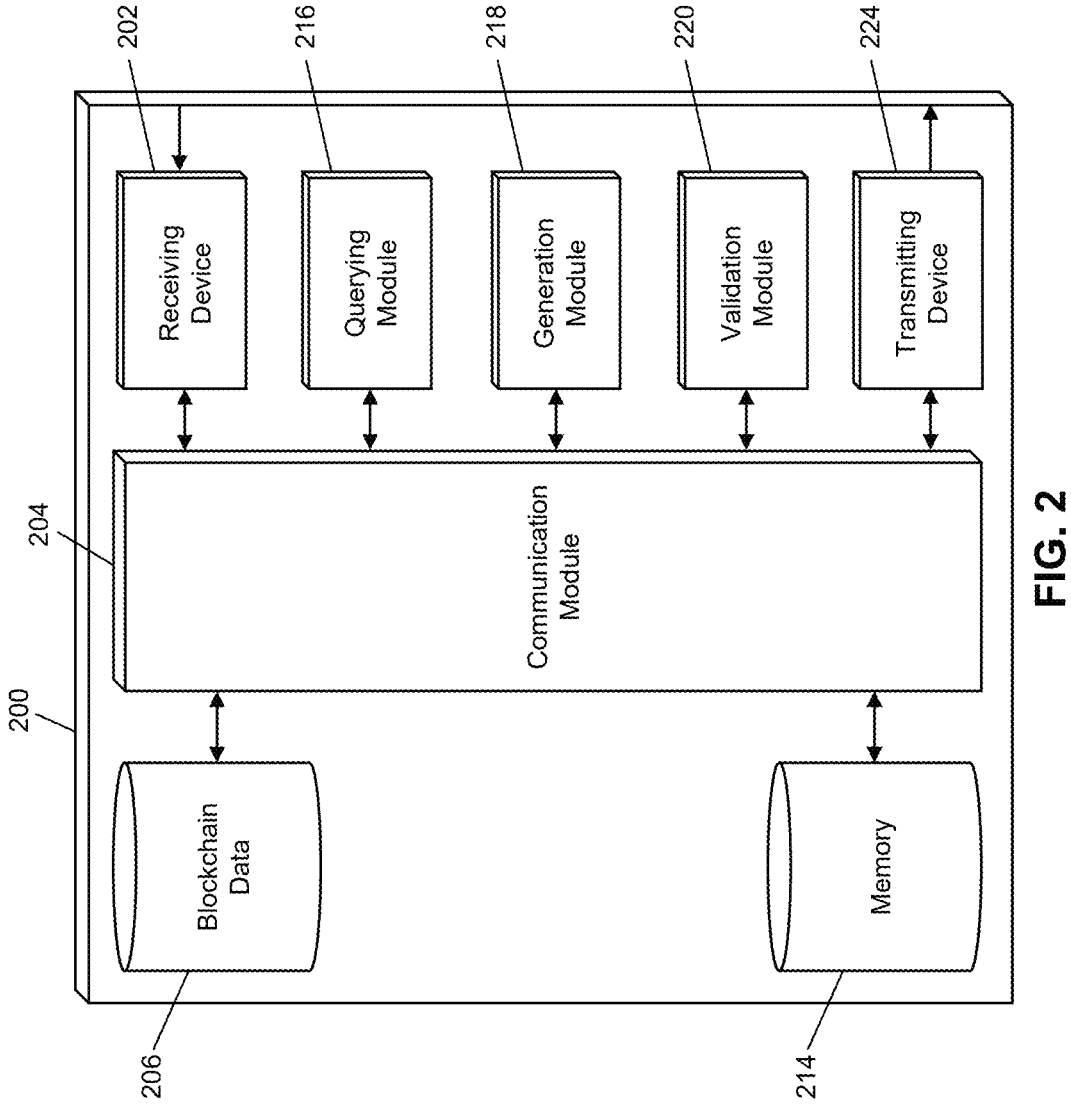
FIG. 2 is a block diagram illustrating a blockchain node in the system of FIG. 1 for enhanced data quality management using blockchain in accordance with exemplary embodiments.
Figure 5:
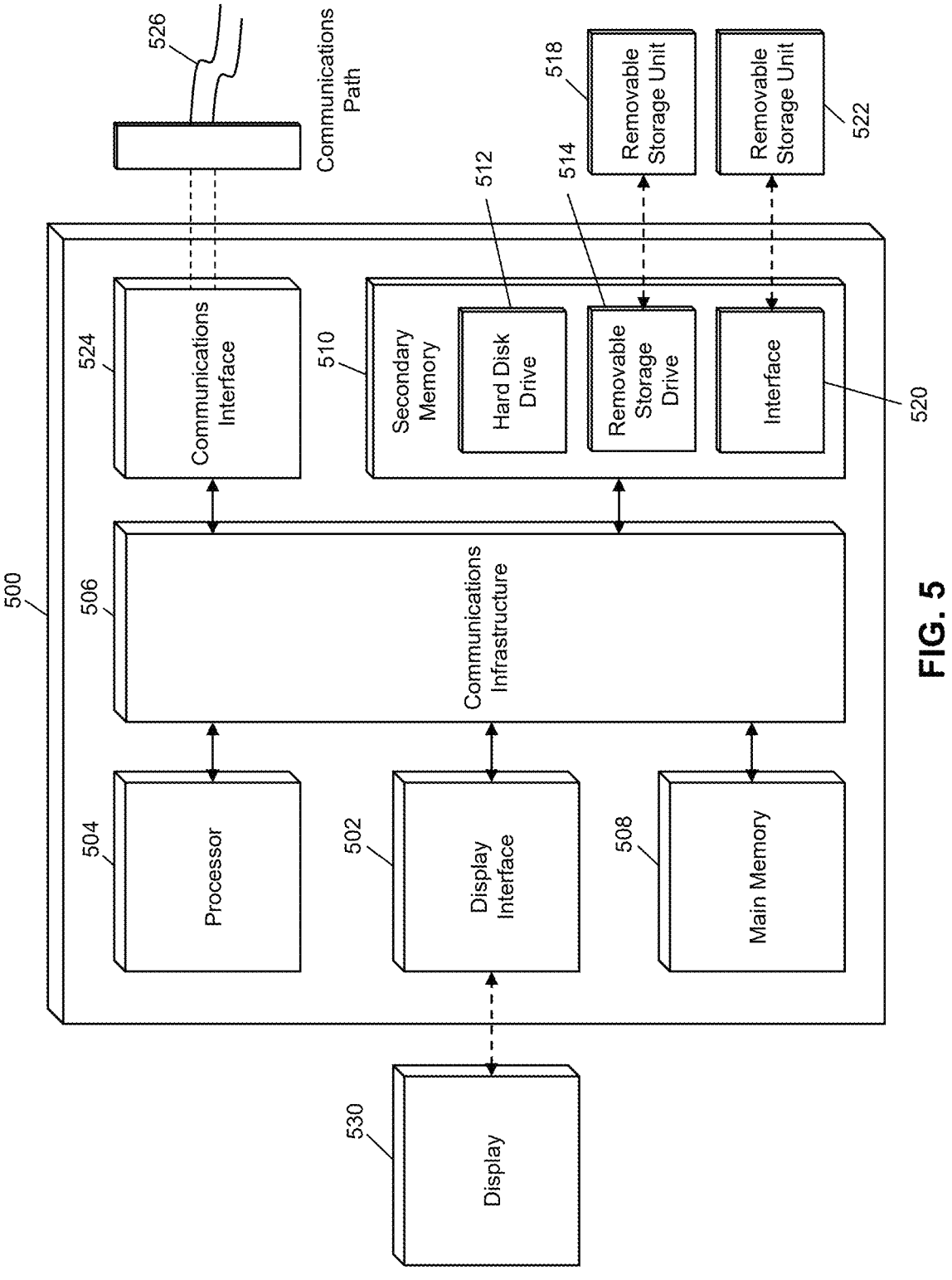
FIG. 5 is a block diagram illustrating a computer system architecture in accordance with exemplary embodiments.

FIG. 1 illustrates a system 100 for the enhancement of the security, reliability, and efficiency of data quality management (DQM) through the use of edge computing and blockchain technologies. The system 100 can include a blockchain network 104. The blockchain network 104 can be comprised of a plurality of blockchain nodes 106. Each blockchain node 106 can be a computing system, such as illustrated in FIG. 2 or 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

The blockchain can be a distributed ledger that is comprised of at least a plurality of blocks. Each block can include at least a block header and one or more data values. Each block header can include at least a timestamp, a block reference value, and a data reference value. The timestamp can be a time at which the block header was generated and can be represented using any suitable method (e.g., UNIX timestamp, DateTime, etc.). The block reference value can be a value that references an earlier block (e.g., based on timestamp) in the blockchain. In some embodiments, a block reference value in a block header can be a reference to the block header of the most recently added block prior to the respective block. In an exemplary embodiment, the block reference value can be a hash value generated via the hashing of the block header of the most recently added block. The data reference value can similarly be a reference to the one or more data values stored in the block that includes the block header. In an exemplary embodiment, the data reference value can be a hash value generated via the hashing of the one or more data values. For instance, the block reference value can be the root of a Merkle tree generated using the one or more data values.

The use of the block reference value and data reference value in each block header can result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node 106 in a blockchain network 104 prior to the generation and addition of a new block to the blockchain in order for the change to be made permanent. Computational and communication limitations can make such a modification exceedingly difficult, if not impossible, thus rendering the blockchain immutable.

In some embodiments, the blockchain can be used to store information regarding blockchain transactions conducted between two different blockchain wallets. A blockchain wallet can include a private key of a cryptographic key pair that is used to generate digital signatures that serve as authorization by a payer for a blockchain transaction, where the digital signature can be verified by the respective blockchain network 104 using the public key of the cryptographic key pair. In some cases, the term "blockchain wallet" can refer specifically to the private key. In other cases, the term "blockchain wallet" can refer to a computing device (e.g., participant system 106) that stores the private key for use thereof in blockchain transactions. For instance, each computing device can each have their own private key for respective cryptographic key pairs and can each be a blockchain wallet for use in transactions with the blockchain associated with the blockchain network. Computing devices can be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain can correspond to a blockchain transaction or other storage of data, as applicable. A blockchain transaction can consist of at least: a digital signature of the sender of that is generated using the sender's private key, a blockchain address of the recipient of currency generated using the recipient's public key, and a blockchain currency amount that is transferred or other data being stored. In some blockchain transactions, the transaction can also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction can also include the sender's public key, for use by an entity in validating the transaction. For the traditional processing of a blockchain transaction, such data can be provided to a blockchain node 106 in a blockchain network 104, either by the sender or the recipient. The node can verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block can be validated by other blockchain nodes 106 in the blockchain network 104 before being added to the blockchain and distributed to all of the blockchain nodes 106 in the blockchain network 104, respectively, in traditional blockchain implementations. In cases where a blockchain data value cannot be related to a blockchain transaction, but instead the storage of other types of data, blockchain data values can still include or otherwise involve the validation of a digital signature.

In the system 100, the blockchain can be used to store data as part of a data management system. Blockchain data entries can be used to store data entries that are of sufficient data quality, as determined using the methods discussed herein via the use of smart contracts. A smart contract is a self-executing program stored on a blockchain that can automate one or more actions as specified. In the system 100, a blockchain node 106 in the blockchain network 104 can receive a plurality of data entries for data that is to be analyzed and stored as part of the data quality management solution provided in the methods and systems discussed herein. The data entries can be provided from one or more data sources 108. The types and systems of data sources 108 can vary based on the gathered data, industry, applicability, and other factors as will be apparent to persons having skill in the relevant art. In some embodiments, the data sources 108 can electronically transmit data entries directly to the blockchain node 106 via one or more suitable communication methods, such as via the Internet.

In other embodiments, the system 100 can include an edge server 110. An edge server can be a server that provides computing resources to local devices that is located at the entry point into a communication network. The use of edge servers as part of communication networks for providing computing resources quicker and more efficiently to local devices is referred to here as "edge computing." The edge server 110 can be located at an entry point for a network in communication with the blockchain node 106 and can also be accessible by the data sources 108. In an exemplary embodiment, the edge server 110 can be geographically located near to the data sources 108 with respective to other servers for collecting data. The data sources 108 can gather the appropriate data entries for transmission to the edge server 110 via a local network, and then the edge server 110 can electronically transmit the plurality of data entries to the blockchain node 106 via the commonly shared network. The use of an edge server 110 can provide for faster communication of data entries while providing less opportunity for manipulation or interception of the data entries for added data security.

In some embodiments, the edge server 110 can be configured to perform initial data analysis on the plurality of data entries. The initial data analysis can be used to identify potential issues in data quality in the plurality of data entries to facilitate faster processing. For instance, the edge server 110 can identify missing data values, improperly formatted data values, or incomplete data sets. Such information can be included in the initial data analysis, which can be provided to the blockchain node 106 with the plurality of data entries.

The blockchain node 106 can receive the plurality of data entries and trigger execution of a smart contract stored on the blockchain. Execution of the smart contract can be triggered by providing of a suitable input for the smart contract, such as by input of the plurality of data entries. In some cases, the plurality of data entries can be provided directly to the smart contract by the blockchain node 106. In other cases, the plurality of data entries can be stored in a location accessible by the smart contract and monitored thereby, such as in the blockchain, in a separate blockchain associated with the blockchain network 104, a remote storage accessible by the smart contract, etc. In instances where initial data analysis has been provided to the blockchain node 106, the blockchain node 106 can also provide the initial data analysis as input.

The smart contract can be configured to perform analysis of the plurality of data entries. The smart contract can include one or more predefined rules that are used in the analysis to measure data quality of the plurality of data entries. The one or more predefined rules can be based on the type of data, format of the data, industry to which the data pertains, type of data sources 108 that gathered the data, etc. As such, the one or more predefined rules can significantly vary depending on the data and needs for the data quality solution. In an example, the plurality of data entries can correspond to transaction data for electronic payment transactions. In this example, each data entry can include a plurality of data values for a particular electronic payment transaction, such as a transaction amount, merchant identifier, transaction time, geographic location, and merchant address. In such an example, a first predefined rule can require that each of the data values has a value (e.g., not null), a second predefined rule can require specific formatting for the transaction amount, and a third predefined rule can require specific formatting and requirements for the transaction time, such as by requiring the time of the transaction including seconds and the date as formatted according to the International Organization of Standardization's ISO 8601 standard.

The smart contract can perform the data analysis using the one or more predefined rules to measure the data quality for the plurality of data entries and generate a data quality level. The data quality level can be a representation of the quality of the data in the plurality of data entries according to an established scale. For instance, the data quality level can be a percentage value from 0 to 100 that represents the percentage of data values that satisfy the applicable predefined rules.

In some embodiments, the smart contract can be configured to perform error correction as part of the analysis using the one or more predefined rules. In such embodiments, the one or more predefined rules can include rules, instructions, guidelines, etc. for correcting any errors identified in the plurality of data entries, such as to format data values, identify missing data values, etc. In the above example where the plurality of data entries is related to payment transactions, a predefined rule can be included in the smart contract to correct an error of a missing transaction amount. For example, the smart contract can identify an average transaction amount from other data entries included in the plurality of data entries or other accessible data entries (e.g., from prior analysis, such as stored in the blockchain or other accessible data storage), such as from all other payment transactions or related (e.g., with the same merchant) payment transactions, and include the identified average transaction amount in place of the missing transaction amount in the data entry. In another example, if the data value for a merchant address is missing, the smart contract can utilize a lookup table using the merchant identifier to identify a corresponding merchant address for inclusion in the data value in the data entry. Once all error corrections have been performed, the smart contract can generate the data quality level.

The smart contract can compare the generated data quality level with a predetermined threshold value. The predetermined threshold value can be a value above which the quality of the gathered data is considered suitable for storage. In an example, if the data quality level is a percentage, the predetermined threshold value can be 85%, 90%, 100%, or other value as may be provided by an entity for which the data entries are being gathered, analyzed, and stored. If data quality level for the plurality of data entries meets the predetermined threshold value, then the smart contract can initiate storage of the plurality of data entries on the blockchain. The smart contract can generate a new blockchain data entry that includes the plurality of data entries and forward the new blockchain data entry to a blockchain node 106 for inclusion in a new block that is confirmed and added to the blockchain using traditional methods and systems. In some cases, the smart contract can provide the measured data quality level or a report indicating the data quality level and any other suitable data (e.g., initial data analysis, error corrections performed, etc.) for inclusion in the new blockchain data entry with the plurality of data entries. The data may then be stored successfully in the blockchain at a sufficient quality level in a manner that is platform agnostic while being more secure, reliable, and efficient than traditional systems.

If the data quality level does not meet the predetermined threshold value, then the smart contract can generate a data quality management (DQM) report. The DQM report can indicate the measured data quality level and any issues with the plurality of data entries that resulted in the unsatisfactory data quality level, such as missing data values, unformatted data values, etc. The DQM report can also include any other desired data, such as error corrections performed, the initial data analysis, information identifying the edge server 110 and/or data sources 108, etc. The smart contract can then electronically transmit, either directly or via a blockchain node 106, the DQM report to a computing system 112. The computing system 112 can be a computing system, such as those illustrated in FIGS. 2 and 5, that is specially configured to perform the functions discussed herein. In some cases, the computing system 112 can be one of the data sources 108, a system of the entity interested in the data storage, a third party system that aids in data quality management, etc. The computing system 112 can receive the DQM report and identify changes or additions to the predefined rules used by the smart contract to increase the data quality of the plurality of data entries. In some cases, a user of the computing system 112 can manually identify or input the changes or additions to the predefined rules. In other cases, the computing system 112 can identify the changes or additions to the predefined rules automatically, such as using programmed logic, instructions, etc., such as by identifying previously established rules or changes that are suitable to fix specific errors as noted in the DQM report. In the example where the plurality of data entries corresponds to transaction data, the first predefined rule requires specific formatting for the transaction amount, but the smart contract may fail to have any predefined rules for error correction of an incorrectly formatted transaction amount. In such an example, the computing system 112 can identify a new predefined rule for use as part of error correction to properly format a transaction amount (e.g., by including or removing a thousands separator, converting the transaction amount to a different currency, etc.).

Once the computing system 112 has identified the changes or additions to the predefined rules, the computing system 112 can electronically transmit the changes or additions to the predefined rules back to the smart contract, either directly or to the blockchain node 106. The predefined rules used by the smart contract can then be updated accordingly. In some cases, the predefined rules can be stored directly in data of the smart contract itself, where updating of the predefined rules can include updating the smart contract itself (e.g., which can require addition of the updated smart contract in a new block stored on the blockchain). In other cases, the predefined rules can be stored in a data storage remotely accessible by the smart contract. In such cases, the blockchain node 106 or smart contract can receive the one or more changes or additions to the predefined rules and update the one or more predefined rules for the smart contract in the remotely accessible data storage.

After the one or more predefined rules for the smart contract have been updated, the smart contract may execute again and perform the error correction and data analysis using the updated one or more predefined rules. The analysis may result in a new measured data quality level for the plurality of data entries. The smart contract can compare the new measured data quality level with the predetermined threshold value and initiate storage of the plurality of data entries (e.g., with further corrected data values) on the blockchain or generation and transmission of a new DQM report, as applicable. The process can continue to repeat updating of the predefined rules for the smart contract and analysis of the plurality of data entries as necessary until the predetermined threshold value has been reached.

The methods and systems discussed herein provide for enhanced reliability, security, and efficiency in data quality management. The use of blockchain technology can ensure a secure, reliable, and efficient way of storing data and established data quality levels, as well as performing reliable and efficient error correction and analysis of data through smart contracts in a manner that is platform agnostic and suitable for all industries and data types via specially configured predefined rules. In cases where edge servers 110 are used to gather the data, reliability and security can be increased even further by providing quicker data gathering and communications and reducing opportunity for data degradation or manipulation. The result are systems and methods that are drastic technological improvements over existing data quality management solutions.

Blockchain Node

FIG. 2 illustrates an embodiment of a blockchain node 106 in the system 100 of FIG. 1. It will be apparent to persons having skill in the relevant art that the embodiment of the blockchain node 106 illustrated in FIG. 2 is provided as illustration only and cannot be exhaustive to all possible configurations of the blockchain node 106 suitable for performing the functions as discussed herein. For example, the computer system 500 illustrated in FIG. 5 and discussed in more detail below can be a suitable configuration of the blockchain node 106.

The blockchain node 106 can include a receiving device 202. The receiving device 202 can be configured to receive data over one or more networks via one or more network protocols. In some instances, the receiving device 202 can be configured to receive data from other blockchain nodes 106, data sources 108, edge servers 110, computing systems 112, and other systems and entities via one or more communication methods, such as radio frequency, local area networks, wireless area networks, cellular communication networks, Bluetooth, the Internet, etc. In some embodiments, the receiving device 202 can be comprised of multiple devices, such as different receiving devices for receiving data over different networks, such as a first receiving device for receiving data over a local area network and a second receiving device for receiving data via the Internet. The receiving device 202 can receive electronically transmitted data signals, where data can be superimposed or otherwise encoded on the data signal and decoded, parsed, read, or otherwise obtained via receipt of the data signal by the receiving device 202. In some instances, the receiving device 202 can include a parsing module for parsing the received data signal to obtain the data superimposed thereon. For example, the receiving device 202 can include a parser program configured to receive and transform the received data signal into usable input for the functions performed by the processing device to carry out the methods and systems described herein.

The receiving device 202 can be configured to receive data signals electronically transmitted by other blockchain nodes 106, which can be superimposed or otherwise encoded with converted device profiles, public keys, configuration keys, configuration key requests, request for identification data, blockchain data entries, blocks, confirmation messages, etc. The receiving device 202 can also be configured to receive data signals electronically transmitted by data sources 108 and/or edge servers 110 that can be superimposed or otherwise encoded with a plurality of data entries, initial data analysis, data values, etc. The receiving device 202 can also be configured to receive data signals electronically transmitted by computing systems 112, which can be superimposed or otherwise encoded with DQM reports, requests for predefined rules, requests for data values, queries for data for use by smart contracts, smart contract programming data, etc.

The blockchain node 106 can also include a communication module 204. The communication module 204 can be configured to transmit data between modules, engines, databases, memories, and other components of the blockchain node 106 for use in performing the functions discussed herein. The communication module 204 can be comprised of one or more communication types and utilize various communication methods for communications within a computing device. For example, the communication module 204 can be comprised of a bus, contact pin connectors, wires, etc. In some embodiments, the communication module 204 can also be configured to communicate between internal components of the blockchain node 106 and external components of the blockchain node 106, such as externally connected databases, display devices, input devices, etc. The blockchain node 106 can also include a processing device. The processing device can be configured to perform the functions of the blockchain node 106 discussed herein as will be apparent to persons having skill in the relevant art. In some embodiments, the processing device can include and/or be comprised of a plurality of engines and/or modules specially configured to perform one or more functions of the processing device, such as a querying module 216, generation module 218, validation module 220, etc. As used herein, the term "module" can be software or hardware particularly programmed to receive an input, perform one or more processes using the input, and provides an output. The input, output, and processes performed by various modules will be apparent to one skilled in the art based upon the present disclosure.

The blockchain node 106 can also include blockchain data 210, which can be stored in a memory 214 of the processing server 102 or stored in a separate area within the blockchain node 106 or accessible thereby. The blockchain data 210 can include a blockchain, which may be comprised of a plurality of blocks and be associated with the blockchain network 104 and a blockchain. In some cases, the blockchain data 210 can further include any other data associated with the blockchain and management and performance thereof, such as block generation algorithms, digital signature generation and confirmation algorithms, communication data for blockchain nodes 106, smart contracts, cryptographic keys, etc.

The blockchain node 106 can also include a memory 214. The memory 214 can be configured to store data for use by the blockchain node 106 in performing the functions discussed herein, such as public and private keys, symmetric keys, etc. The memory 214 can be configured to store data using suitable data formatting methods and schema and can be any suitable type of memory, such as read-only memory, random access memory, etc. The memory 214 can include, for example, encryption keys and algorithms, communication protocols and standards, data formatting standards and protocols, program code for modules and application programs of the processing device, and other data that can be suitable for use by the blockchain node 106 in the performance of the functions disclosed herein as will be apparent to persons having skill in the relevant art. In some embodiments, the memory 214 can be comprised of or can otherwise include a relational database that utilizes structured query language for the storage, identification, modifying, updating, accessing, etc. of structured data sets stored therein. The memory 214 can be configured to store, for example, device profiles, device profile data, configuration keys, cryptographic keys including public keys and/or private keys, communication data, blockchain algorithms and data, predefined rules, predetermined threshold values, data quality algorithms, etc.

The blockchain node 106 can include a querying module 216. The querying module 216 can be configured to execute queries on databases to identify information. The querying module 216 can receive one or more data values or query strings and can execute a query string based thereon on an indicated database, such as the blockchain data 206 of the blockchain node 106 to identify information stored therein. The querying module 216 can then output the identified information to an appropriate engine or module of the blockchain node 106 as necessary. The querying module 216 can, for example, execute a query on the memory 214 of the blockchain node 106 to update one or more predefined rules associated with a smart contract based on updates and/or changes received from a computing system 112.

The blockchain node 106 can also include a generation module 218. The generation module 218 can be configured to generate data for use by the blockchain node 106 in performing the functions discussed herein. The generation module 218 can receive instructions as input, can generate data based on the instructions, and can output the generated data to one or more modules of the blockchain node 106. For example, the generation module 218 can be configured to generate blockchain data entries, blocks, encryption keys, request messages, confirmation messages, smart contracts, predefined rules, data quality analysis, etc.

The blockchain node 106 can also include a validation module 220. The validation module 220 can be configured to perform data validations and verifications for the blockchain node 106 as part of the functions discussed herein. The validation module 220 can receive instructions as input, can perform data validations or verification as instructed, and can output a result of the data validations or verifications to one or more modules of the blockchain node 106. In some cases, the input can include the data to be validated or verified and/or data to be used in the validation or verification. In other cases, the validation module 220 can be configured to identify such data, such as in the device database 206 and/or memory 214. The validation module 220 can be configured to, for example, validate new blockchain data entries and/or blocks, verify digital signatures, validate device profile data, verify successful encryptions, verify configuration key or cryptographic key authenticity, etc.

The blockchain node 106 can also include a transmitting device 224. The transmitting device 224 can be configured to transmit data over one or more networks via one or more network protocols. In some instances, the transmitting device 224 can be configured to transmit data to other blockchain nodes 106, data sources 108, edge servers 110, computing systems 112, and other entities via one or more communication methods, local area networks, wireless area networks, cellular communication, Bluetooth, radio frequency, the Internet, etc. In some embodiments, the transmitting device 224 can be comprised of multiple devices, such as different transmitting devices for transmitting data over different networks, such as a first transmitting device for transmitting data over a local area network and a second transmitting device for transmitting data via the Internet. The transmitting device 224 can electronically transmit data signals that have data superimposed that can be parsed by a receiving computing device. In some instances, the transmitting device 224 can include one or more modules for superimposing, encoding, or otherwise formatting data into data signals suitable for transmission.

The transmitting device 224 can be configured to electronically transmit data signals to other blockchain nodes 106, which can be superimposed or otherwise encoded with converted device profiles, public key requests, configuration keys, configuration key requests, identification, device profile requests, blockchain data entries, blocks, confirmation messages, etc. The transmitting device 224 can also be configured to electronically transmit data signals to data sources 108 and/or edge servers 110 that can be superimposed or otherwise encoded with data entry requests, requests for predefined rules, requests for data values, etc. The transmitting device 224 can also be configured to electronically transmit data signals to computing systems 112, which can be superimposed or otherwise encoded with DQM reports, request for predefined rules, plurality of data entries, initial data analysis, requests for data values, etc.

Process for Enhanced Data Quality Management

Figure 3A:
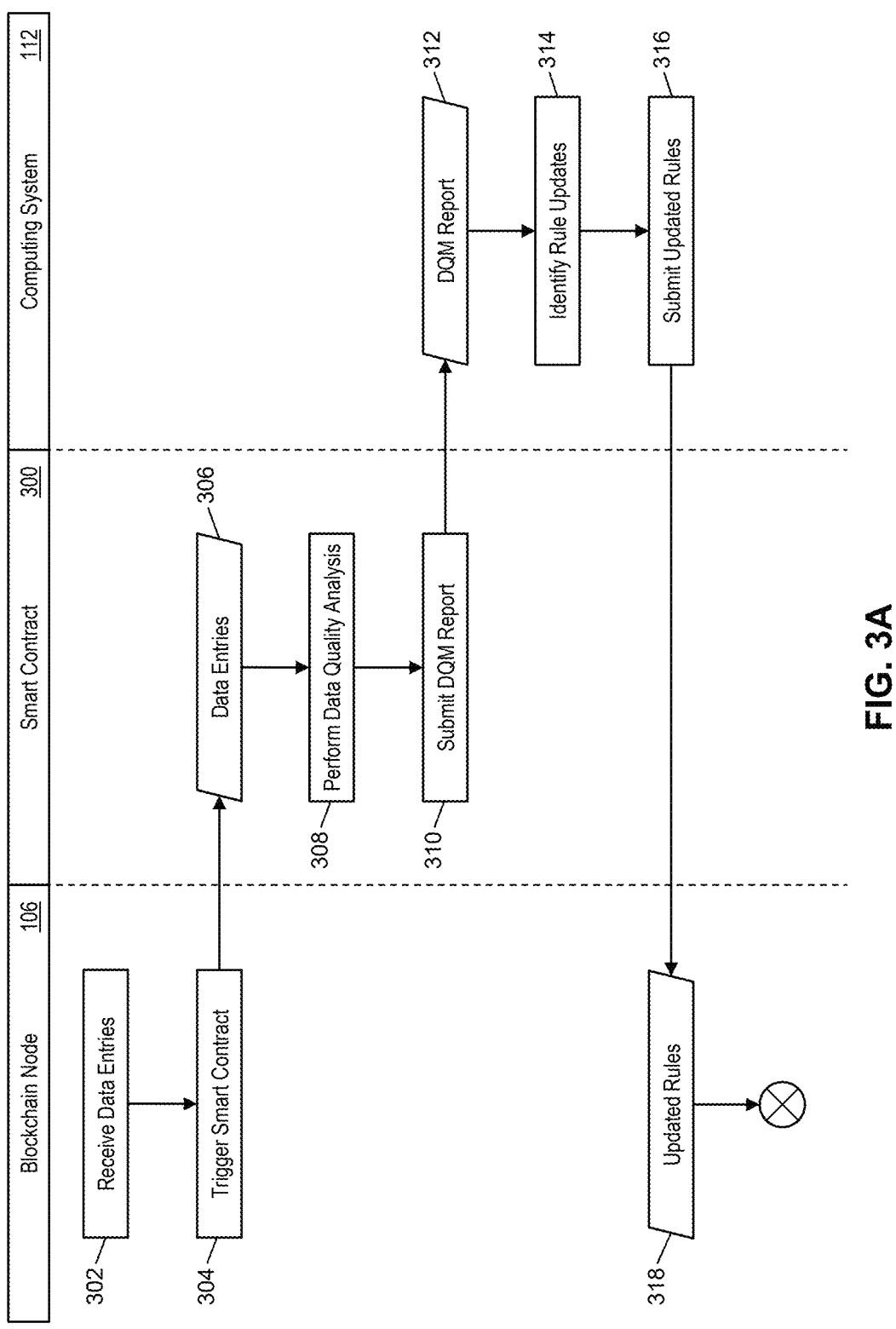
FIGS. 3A and 3B are a flow diagram illustrating a process for enhanced data quality management using blockchain in the system of FIG. 1 in accordance with exemplary embodiments.
Figure 3B:
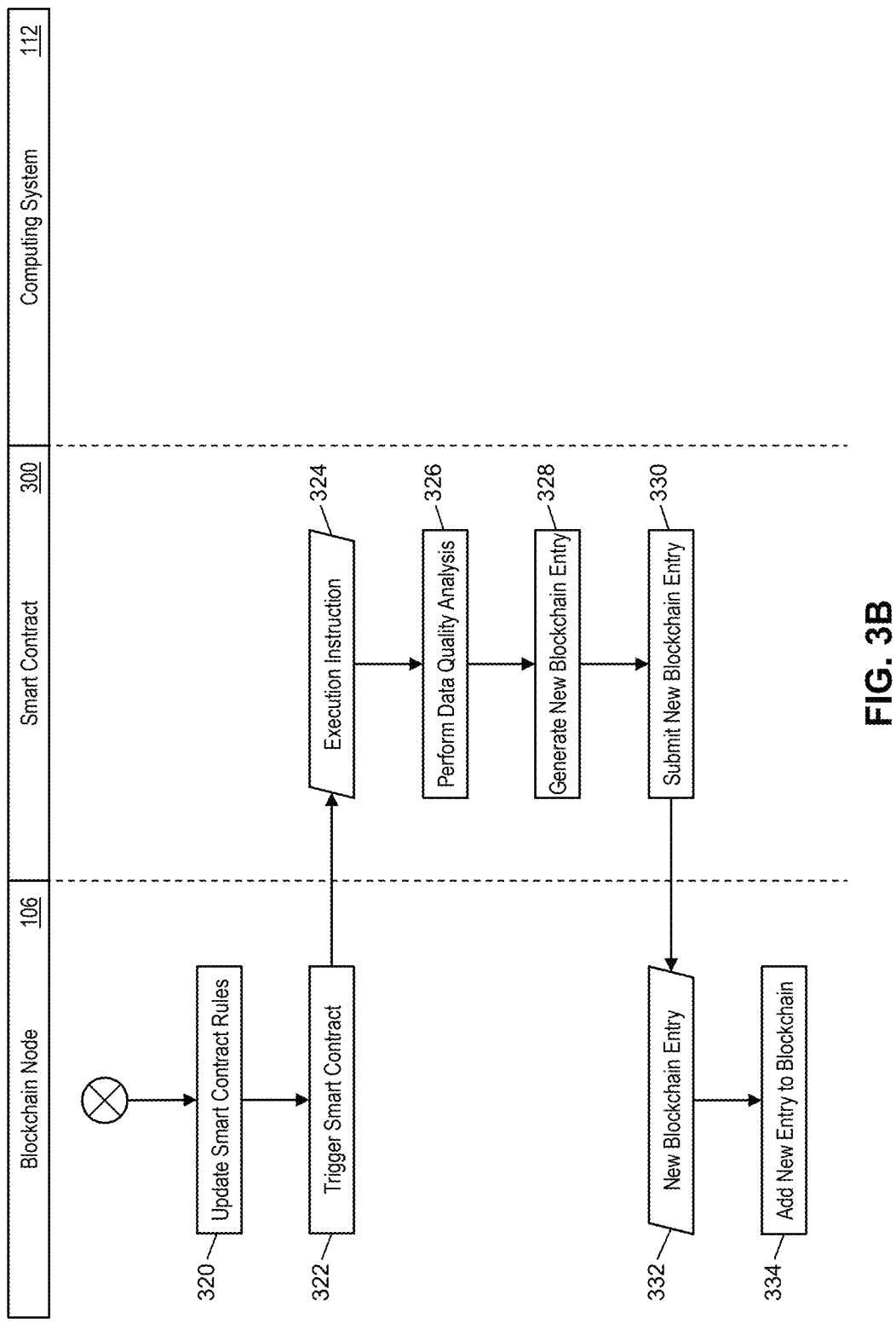

FIGS. 3A and 3B illustrate a process in the system 100 of FIG. 1 for enhancing data quality management through the use of a blockchain and a smart contract 300 stored on the blockchain.

In step 302, the receiving device 202 of the blockchain node 106 can receive a plurality of data entries for the processing of enhanced data quality analysis. The plurality of data entries can be received directly from one or more data sources 108, or can be received from an edge server 110, which can also provide results of an initial data analysis performed on the plurality of data entries. In step 304, the blockchain node 106 can trigger execution of the smart contract 300 by providing the received plurality of data entries (e.g., and initial data analysis results, as applicable) to the smart contract as input. In step 306, the smart contract 300 can receive the plurality of data entries and self-execute as specified in its configuration. During execution, the smart contract 300 can, in step 308, perform data quality analysis on the plurality of data entries, which can include identification of any data quality errors based on comparison to data known to be correct, unrecognize data formats or other formatting errors, data entries that are out of expected range or value, performing of error correction according to one or more predefined rules accessible by the smart contract 300 such as correcting data based on past fixes of the same or similar errors (e.g., a comma instead of a period in a given number), and the measuring of a data quality level for the plurality of data entries after error correction based on the one or more predefined rules such as counting the number of errors, which may be weighted counts, determining if the error is critical, troublesome or ignorable, or any suitable error detection, correction rules or quality level mechanisms that give meaningful information to a relevant audience. The measured data quality level can be below a predetermined threshold value, which can cause the smart contract 300 to, in step 310, generate a data quality management (DQM) report indicating the measured data quality level, identified errors in the data quality, and any other suitable data, such as the existing one or more predefined rules and performed error corrections. The smart contract 300 can submit the generated DQM report to the computing system 112 using a suitable communication network and method.

In step 312, the computing system 112 can receive the DQM report generated by the smart contract 300. In step 314, the computing system 112 can identify one or more changes or additions to the predefined rules accessible by the smart contract 300 based on the data quality errors identified in the DQM report, where the changes or additions to the predefined rules are designed to correct the data quality errors identified in the DQM report. In step 316, the computing system 112 can electronically transmit the identified one or more changes or additions to the blockchain node 106 using a suitable communication network and method. In step 318, the receiving device 202 of the blockchain node 106 can receive the one or more changes or additions to the predefined rules.

In step 320, the querying module 216 of the blockchain node 106 can execute a query on the memory 214 of the blockchain node 106 to update the one or more predefined rules stored therein accessible by the smart contract 300 that are used in the data analysis. The one or more predefined rules can be updated with the one or more additions or changes received from the computing system 112. In step 322, the blockchain node 106 can trigger a new execution of the smart contract 300 to perform analysis of the plurality of data entries using the updated one or more predefined rules. In step 324, the smart contract 300 can receive the instruction to self-execute again using the plurality of data entries and can initiate the self-execution. In step 326, the smart contract 300 can repeat performance of the data quality analysis on the plurality of data entries using the updated one or more predefined rules to perform additional error correction and generate a new data quality level. If the data quality level does not meet the predetermined threshold value, the process can repeat steps 310 through 326.

Once the data quality level meets the predetermined threshold value, then, in step 328, the smart contract 300 can generate a new blockchain data entry that includes at least the plurality of data entries that have been error corrected and achieved the sufficient level of data quality. In some cases, the smart contract 300 can also generate a new DQM report indicating the satisfactory data quality level that can be included in the new blockchain data entry. In step 330, the smart contract 300 can electronically transmit the new blockchain data entry to the blockchain node 106 using a suitable communication network and method. In step 332, the receiving device 202 of the blockchain node 106 can receive the new blockchain data entry. In step 334, the blockchain node 106 can include the new blockchain data entry in a new block that is generated, confirmed, and added to the blockchain using traditional methods.

Exemplary Method for Enhanced Data Quality Management

FIG. 4 illustrates a method 400 for enhancing security, reliability, and efficiency of data quality management.

In step 402, blockchain data can be stored in a blockchain node (e.g., blockchain node 106) of a blockchain network (e.g., blockchain network 104) for a blockchain associated with the blockchain network, where the blockchain data includes at least a smart contract (e.g., smart contract 300). In step 404, a plurality of data entries can be received by a receiver (e.g., receiving device 202) of the blockchain node.

In step 406, the blockchain node can trigger execution of the smart contract using the plurality of data entries as input. The executed smart contract can perform error correction on the plurality of data entries according to one or more predefined rules and analyzes the plurality of data entries for data quality, and, if the data quality is below a predetermined threshold value, generate and transmit a data quality report to an external computing system (e.g., computing system 112), wherein the data quality report indicates one or more data quality issues based on the analysis, or, if the data quality is above the predetermined threshold value, generate a new blockchain data entry that includes the plurality of data entries and transmit the generated new blockchain data entry to one or more additional nodes in the blockchain network. In step 408, the receiver of the blockchain node can receive one or more changes or additions to the one or more predefined rules.

In step 410, the one or more predefined rules in the smart contract can be updated by a processor (e.g., querying module 216) of the blockchain node based on the received one or more changes or additions to the one or more predefined rules. In step 412, the blockchain node can repeat execution of the smart contract after updating the one or more predefined rules in the smart contract using the plurality of data entries as input.

In one embodiment, receipt of the one or more changes or additions to the one or more predefined rules, updating of the one or more predefined rules in the smart contract, and repeating execution of the smart contract can each be repeated until the data quality is above the predetermined threshold value. In some embodiments, the plurality of data entries can be received from an edge server (e.g., edge server 110). In a further embodiment, the edge server can be configured to perform initial data analysis on the plurality of data entries prior to receipt by the blockchain node.

In one embodiment, the new blockchain data entry can further include an indication of the data quality. In some embodiments, the predetermined threshold value can indicate zero data quality issues or missing data values. In one embodiment, the one or more changes or additions to the one or more predefined rules can be received from the external computing system. In some embodiments, the one or more predefined rules can be stored in a remote location accessible by the smart contract.

Computer System Architecture

FIG. 5 illustrates a computer system 500 in which embodiments of the present disclosure, or portions thereof, can be implemented as computer-readable code. For example, the blockchain nodes 106, data sources 108, edge server 110, and computing system 112 can be implemented in the computer system 500 using hardware, non-transitory computer readable media having instructions stored thereon, or a combination thereof and can be implemented in one or more computer systems or other processing systems. Hardware can embody modules and components used to implement the methods of FIGS. 3A, 3B, and 4.

If programmable logic is used, such logic can execute on a commercially available processing platform configured by executable software code to become a specific purpose computer or a special purpose device (e.g., programmable logic array, application-specific integrated circuit, etc.). A person having ordinary skill in the art can appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, at least one processor device and a memory can be used to implement the above described embodiments.

A processor unit or device as discussed herein can be a single processor, a plurality of processors, or combinations thereof. Processor devices can have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

Processor device 504 can be a special purpose or a general purpose processor device specifically configured to perform the functions discussed herein. The processor device 504 can be connected to a communications infrastructure 506, such as a bus, message queue, network, multi-core message-passing scheme, etc. The network can be any network suitable for performing the functions as disclosed herein and can include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 can also include a main memory 508 (e.g., random access memory, read-only memory, etc.), and can also include a secondary memory 510. The secondary memory 510 can include the hard disk drive 512 and a removable storage drive 514, such as a floppy disk drive, a magnetic tape drive, an optical disk drive, a flash memory, etc.

The removable storage drive 514 can read from and/or write to the removable storage unit 518 in a well-known manner. The removable storage unit 518 can include a removable storage media that can be read by and written to by the removable storage drive 514. For example, if the removable storage drive 514 is a floppy disk drive or universal serial bus port, the removable storage unit 518 can be a floppy disk or portable flash drive, respectively. In one embodiment, the removable storage unit 518 can be non-transitory computer readable recording media.

In some embodiments, the secondary memory 510 can include alternative means for allowing computer programs or other instructions to be loaded into the computer system 500, for example, the removable storage unit 522 and an interface 520. Examples of such means can include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) can be stored on any type of suitable computer readable media, such as optical storage (e.g., a compact disc, digital versatile disc, Blu-ray disc, etc.) or magnetic tape storage (e.g., a hard disk drive). The data can be configured in any type of suitable database configuration, such as a relational database, a structured query language (SQL) database, a distributed database, an object database, etc. Suitable configurations and storage types will be apparent to persons having skill in the relevant art.

The computer system 500 can also include a communications interface 524. The communications interface 524 can be configured to allow software and data to be transferred between the computer system 500 and external devices. Exemplary communications interfaces 524 can include a modem, a network interface (e.g., an Ethernet card), a communications port, a PCMCIA slot and card, etc. Software and data transferred via the communications interface 524 can be in the form of signals, which can be electronic, electromagnetic, optical, or other signals as will be apparent to persons having skill in the relevant art. The signals can travel via a communications path 526, which can be configured to carry the signals and can be implemented using wire, cable, fiber optics, a phone line, a cellular phone link, a radio frequency link, etc.

The computer system 500 can further include a display interface 502. The display interface 502 can be configured to allow data to be transferred between the computer system 500 and external display 530. Exemplary display interfaces 502 can include high-definition multimedia interface (HDMI), digital visual interface (DVI), video graphics array (VGA), etc. The display 530 can be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium can refer to memories, such as the main memory 508 and secondary memory 510, which can be memory semiconductors (e.g., DRAMs, etc.). These computer program products can be means for providing software to the computer system 500. Computer programs (e.g., computer control logic) can be stored in the main memory 508 and/or the secondary memory 510. Computer programs can also be received via the communications interface 524. Such computer programs, when executed, can enable computer system 500 to implement the present methods as discussed herein. In particular, the computer programs, when executed, can enable processor device 504 to implement the methods illustrated by FIGS. 3A, 3B, and 4, as discussed herein. Accordingly, such computer programs can represent controllers of the computer system 500. Where the present disclosure is implemented using software, the software can be stored in a computer program product and loaded into the computer system 500 using the removable storage drive 514, interface 520, and hard disk drive 512, or communications interface 524.

The processor device 504 can comprise one or more modules or engines configured to perform the functions of the computer system 500. Each of the modules or engines can be implemented using hardware and, in some instances, can also utilize software, such as corresponding to program code and/or programs stored in the main memory 508 or secondary memory 510. In such instances, program code can be compiled by the processor device 504 (e.g., by a compiling module or engine) prior to execution by the hardware of the computer system 500. For example, the program code can be source code written in a programming language that is translated into a lower level language, such as assembly language or machine code, for execution by the processor device 504 and/or any additional hardware components of the computer system 500. The process of compiling can include the use of lexical analysis, preprocessing, parsing, semantic analysis, syntax-directed translation, code generation, code optimization, and any other techniques that can be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for enhancing security, reliability, and efficiency of data quality management. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or can be acquired from practicing of the disclosure, without departing from the breadth or scope.

What is claimed is:

1. A method for enhancing security, reliability, and efficiency of data quality management, comprising:

retrieving, by an edge server in a network system, a plurality of data entries from a plurality of data sources, wherein the edge server is off-chain with respect to a blockchain network and is located in close proximity to the plurality of data sources with respect to other servers;

performing, by the edge server, an initial data analysis on the plurality of data entries retrieved from the plurality of data sources and facilitating faster processing by identifying potential issues in data quality in the plurality of data entries;

transmitting, by the edge server, the plurality of data entries to a blockchain node in the blockchain network;

receiving, by a receiver of the blockchain node, the plurality of data entries from the edge server;

storing, in the blockchain node, blockchain data for a blockchain associated with the blockchain network, wherein the blockchain data includes at least a smart contract;

triggering, by the blockchain node, execution of the smart contract using the plurality of data entries, received from the edge server, as input, wherein the executed smart contract performs error correction on the plurality of data entries according to one or more predefined rules and analyzes the plurality of data entries for data quality, and determines whether the data quality is above or below a predetermined threshold value, wherein in response to the data quality being below the predetermined threshold value, the executed smart contract generates and transmits a data quality report to an external computing system, wherein the data quality report indicates one or more data quality issues, and in response to the data quality being above the predetermined threshold value, the executed smart contract generates a new blockchain data entry that includes the plurality of data entries and transmits the generated new blockchain data entry to one or more additional nodes in the blockchain network;

receiving, by the receiver of the blockchain node, one or more changes or additions to the one or more predefined rules;

updating, by a processor of the blockchain node, the one or more predefined rules in the smart contract based on the received one or more changes or additions to the one or more predefined rules; and repeating, by the blockchain node, execution of the smart contract after updating the one or more predefined rules in the smart contract using the plurality of data entries as input.

2. The method of claim 1, wherein receipt of the one or more changes or additions to the one or more predefined rules, updating of the one or more predefined rules in the smart contract, and repeating execution of the smart contract are each repeated until the data quality is above the predetermined threshold value.

3. The method of claim 1, wherein the new blockchain data entry further includes an indication of the data quality.

4. The method of claim 1, wherein the predetermined threshold value indicates zero data quality issues or missing data values.

5. The method of claim 1, wherein the one or more changes or additions to the one or more predefined rules are received from the external computing system.

6. The method of claim 1, wherein the one or more predefined rules are stored in a remote location accessible by the smart contract.

7. A system for enhancing security, reliability, and efficiency of data quality management, comprising:

a blockchain network;

an external computing system;

a blockchain node included in the blockchain network;

one or more additional nodes included in the blockchain network, and an edge server configured to retrieve a plurality of data entries from a plurality of data sources, perform an initial data analysis on the plurality of data entries retrieved from the plurality of data sources and facilitate faster processing by identifying potential issues in data quality in the plurality of data entries, and after performing the initial data analysis, transmit the plurality of data entries to the blockchain node in the blockchain network, wherein the edge server is off-chain with respect to the blockchain network and is located in close proximity to the plurality of data sources with respect to other servers, wherein the blockchain node includes a memory storing blockchain data for a blockchain associated with the blockchain network, the blockchain data including at least a smart contract, a receiver receiving the plurality of data entries from the edge server, and a processor, the blockchain node triggers execution of the smart contract using the plurality of data entries as input, the executed smart contract performs error correction on the plurality of data entries according to one or more predefined rules and analyzes the plurality of data entries for data quality, and determines whether the data quality is above or below a predetermined threshold value, wherein in response to the data quality being below the predetermined threshold value, the executed smart contract generates and transmits a data quality report to an external computing system, wherein the data quality report indicates one or more data quality issues, and in response to the data quality being above the predetermined threshold value, generates a new blockchain data entry that includes the plurality of data entries and transmits the generated new blockchain data entry to one or more additional nodes in the blockchain network, the receiver of the blockchain node receives one or more changes or additions to the one or more predefined rules, the processor of the blockchain node updates the one or more predefined rules in the smart contract based on the received one or more changes or additions to the one or more predefined rules, and the blockchain node repeats execution of the smart contract after updating the one or more predefined rules in the smart contract using the plurality of data entries as input.

8. The system of claim 7, wherein receipt of the one or more changes or additions to the one or more predefined rules, updating of the one or more predefined rules in the smart contract, and repeating execution of the smart contract are each repeated until the data quality is above the predetermined threshold value.

9. The system of claim 7, wherein the new blockchain data entry further includes an indication of the data quality.

10. The system of claim 7, wherein the predetermined threshold value indicates zero data quality issues or missing data values.

11. The system of claim 7, wherein the one or more changes or additions to the one or more predefined rules are received from the external computing system.

12. The system of claim 7, wherein the one or more predefined rules are stored in a remote location accessible by the smart contract.

5

* * * * *